No. 831,991. PATENTED SEPT. 25, 1906.
E. PYLE.
HOOK.
APPLICATION FILED MAY 24, 1904.

Witnesses
Geo Ackman Jr.
C. C. Hines.

Inventor
Edward Pyle,
By Victor J. Evans,
Attorney

UNITED STATES PATENT OFFICE.

EDWARD PYLE, OF LINCOLN, NEBRASKA.

HOOK.

No. 831,991.	Specification of Letters Patent.	Patented Sept. 25, 1906.

Application filed May 24, 1904. Serial No. 209,515.

*To all whom it may concern:*

Be it known that I, EDWARD PYLE, a citizen of the United States, residing at Lincoln, in the county of Lancaster and State of Nebraska, have invented new and useful Improvements in Hooks, of which the following is a specification.

This invention relates to improvements in hooks—such as snap-hooks, blanket-strap hooks, and the like—the object of the invention being to provide a simple, cheap, and effective construction of hook having a spring-closure mounted and constructed in a novel manner to facilitate the insertion and removal of the object to be held and to effectually prevent casual disconnection of the same from the hook and, further, to provide a novel mode of fastening the spring in position so as to relieve it from overstrain.

Figure 1:
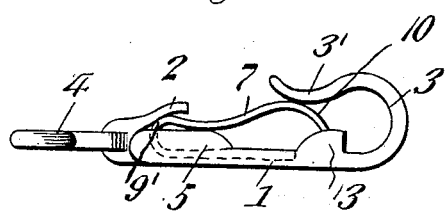
Figure 4:
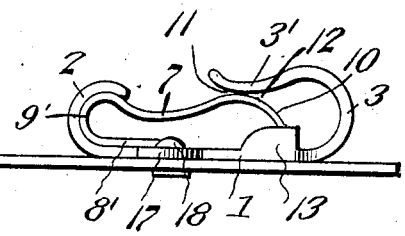
Figure 2:
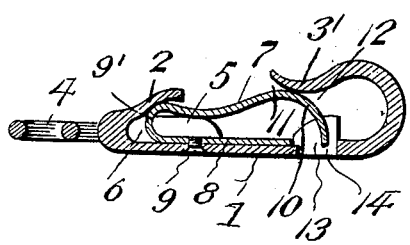
Figure 5:
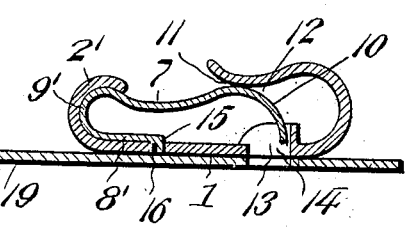
Figure 3:
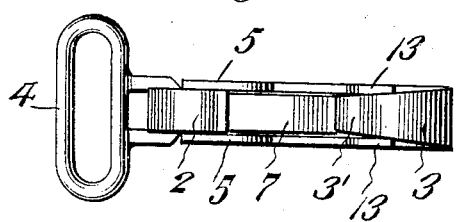
Figure 6:
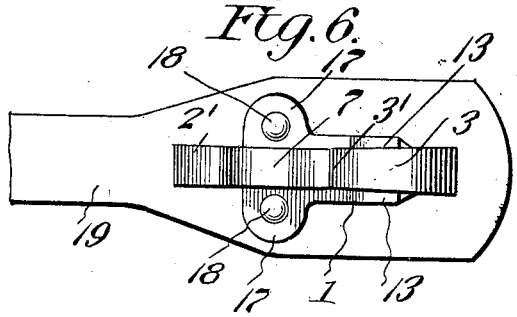

In the accompanying drawings, Figures 1, 2, and 3 are respectively a side elevation, a central vertical longitudinal section, and a top plan view of a snap-hook constructed in accordance with my invention. Figs. 4, 5, and 6 are similar views showing a modification in the construction of the hook.

Referring now more particularly to Figs. 1, 2, and 3 of the drawings, the numeral 1 designates a base-plate having at one end an upwardly and forwardly turned spring-retaining hook 2 and at its opposite end a catch-hook 3, both of said hooks being formed integral with the plate and the hook 3 turned upwardly and rearwardly, so that the bills of the hooks project toward one another. To the hooked portion 2 is suitably attached a loop 4 for connecting the hook with a strap or other part to which it is to be applied, and upon the base-plate 1 are formed flanges 5, arranged in parallel relation on opposite sides of and extending forwardly beyond the hook 2, so as to provide, with the body portion of the latter, a chamber or receiving-space 6, whose bottom wall is formed by the base-plate. The hook 3 has its free extremity or bill portion 3' arcuately curved, as shown. A guard-spring 7 is mounted upon the base-plate and within the chamber 6 and has its free end arranged to abut against the bill of the hook 3 and to form a closure therefor. This guard-spring is in the form of a plate or ribbon spring and consists of a thin strip of spring metal having one of its ends arranged to form a base portion 8, which rests upon the base-plate and is secured thereto by one or more screws or other fastenings 9. The intermediate portion of this spring is bent to form a loop 9', which is disposed within the chamber 6 and held from upward and lateral displacement therein by the retaining-hook 2 and the side flanges 5, whereby the spring is firmly and securely confined in position. The free end of the spring extends in bowed formation between the retaining-hook 2 and bill of the catch-hook 3 and is adapted to be engaged by the thumb or finger, so as to be forced toward the base-plate to permit of the ready disengagement of the object secured by the catch-hook. The said free end of the spring has an arcuately curved or bowed terminal 10, the convex face of which bears upon the corresponding face of the bill 3', and thereby forms therewith the flaring entrance and exit spaces or throat portions 11 and 12 to admit of the ready insertion of a ring or other object to be secured to the hook 3 and the disengagement of the same therefrom. The free extremity of the arcuate terminal 10 extends below the hook 3 and between a pair of guiding cheek-pieces 13, integrally formed upon the base above a slot 14 therein, which slot permits the guard portion of the spring to have an increased range of movement for the insertion and removal of large rings and other objects and also allows any dirt or other foreign matter that may collect in the hook to freely discharge, while the cheek-pieces 13 hold the guard portion of the spring from lateral movement, thus maintaining the convex surface thereof in contact with the bill of the hook. It will be observed that the cheek-pieces 13 are spaced from the curved body or bight portion of the catch-hook. By this arrangement the cheek-pieces, in addition to serving as guides for the extremity of the arcuate terminal of the spring, perform the function of guards to prevent the object held by the catch-hook from working through the space between the spring-terminal and slotted portion of the base-plate into the space between said base-plate and that portion of the free end of the spring extending between the retaining and catch hooks. It will thus be seen that the spring is firmly secured in position upon the base in a simple and effective manner and held from undue play, while it is so arranged as to be freely pressed toward the base for the disengagement of the object from the hook 3, and that withal the construction is such as to adapt the device to be manufactured and sold at a comparatively low cost. By so constructing the walls of the chamber 6 that the bottom or base wall thereof is formed by the rear portion of the base 1 and lies flush with the upper surface of the base it will be apparent that the operation of applying the spring may be conveniently carried out, thus materially lessening the labor in the assemblage of the parts in the factory and facilitating the output with a given number of employees.

In the modification of the invention shown in Figs. 4, 5, and 6 the same general structure shown in Figs. 1, 2, and 3 is employed; but the free end of the base portion 8' of the spring is bent downward to form a retaining-tongue 15, which engages a transverse slot 16, formed in the base 1, thus connecting it with the base, while the bent or looped portion 9' of said spring fits snugly within the retaining-hook 2', which is curved to conform therewith and bear at all portions thereagainst and hold the bent portion 9' of the spring in compressed condition. This construction obviates the necessity of employing the flanges 5 and forming a complete chamber 6 for the housing of the coil. The construction of the hook is otherwise the same as that shown in Figs. 1, 2, and 3, except that the base-plate 1 is provided in place of loop 4 with laterally-extending ears 17, perforated for the passage of fastening-rivets 18, whereby the hook may be attached to a blanket-strap or other suitable support 19.

Having thus described the invention, what I claim is—

A fastening device of the character described comprising a base-plate provided at one end with a retaining-hook and at its opposite end with a catch-hook having an arcuate bill, said plate also being provided below the inner end of said bill with a transverse slot and short parallel longitudinal flanges or cheek-pieces on opposite sides of the slot, said flanges being formed integral with the plate and independent of the catch-hook and spaced from the bight portion of said hook, and a guard-spring having a base portion resting upon and fastened at one end to the base-plate, an intermediate loop held by the retaining-hook, and having its free end extending between the retaining-hook and catch-hook and formed with an arcuately-curved terminal having its convex face bearing against the convex face of the bill of the catch-hook and forming therewith flaring entrance and exit spaces, the extremity of said terminal projecting toward the base-plate and between the cheek-pieces and lying above the transverse slot and adapted to move thereinto, the cheek-pieces forming guipes for the said spring-terminal and guarding the space between the extremity of the terminal and the slotted portion of the base-plate.

In testimony whereof I affix my signature in presence of two witnesses.

EDWARD PYLE.

Witnesses:
MORRISON H. CHRISTY,
THEO. STAUNSICS.